United States Patent
Chang et al.

(10) Patent No.: US 7,107,157 B2
(45) Date of Patent: Sep. 12, 2006

(54) AUTOMATED MEASURING SYSTEM AND METHOD

(75) Inventors: Hsin-Pei Chang, Tu-Cheng (TW); Chih-Kuang Chang, Tu-Cheng (TW)

(73) Assignee: Hon Hai Precision Industry Co., Ltd., (TW)

( * ) Notice: Subject to any disclaimer, the term of this patent is extended or adjusted under 35 U.S.C. 154(b) by 167 days.

(21) Appl. No.: 10/891,711

(22) Filed: Jul. 15, 2004

(65) Prior Publication Data

US 2005/0049822 A1    Mar. 3, 2005

(30) Foreign Application Priority Data

Aug. 27, 2003   (TW)  .............................. 92123530 A

(51) Int. Cl.
*G06F 19/00* (2006.01)
*G06F 15/00* (2006.01)

(52) U.S. Cl. ........................................................ 702/32
(58) Field of Classification Search ................... 702/32
See application file for complete search history.

(56) References Cited

U.S. PATENT DOCUMENTS 6,621,278 B1    9/2003  Ariav
6,738,727 B1 *  5/2004  Chang ........................ 702/167

\* cited by examiner

*Primary Examiner*—Michael Nghiem
*Assistant Examiner*—Cindy Khuu
(74) *Attorney, Agent, or Firm*—Morris Manning & Martin LLP; Tim Tingkang Xia, Esq.

(57) ABSTRACT

An automated measuring system includes an application server (2), a database server (1), and client computers (4) and measurement apparatuses (5) linking to the application server through a network (3). The application server includes a measurement information receiving module (21) for receiving measurement information; a procedure encoding module (23) for encoding all required measurement procedures for objects to be measured; a measurement apparatus assigning module (24) for assigning a suitable measurement apparatus to each of dimensions of the objects; a measuring module (25) for running the encoded measurement procedures to measure all the dimensions of the objects through the assigned measurement apparatuses; a tolerance calculating module (26) for obtaining measured data and a design value of each dimension, and for calculating an actual upper tolerance and an actual lower tolerance for each dimension; and a report generating module (28) for generating measurement reports. A measuring method is also disclosed.

15 Claims, 6 Drawing Sheets

AUTOMATED MEASURING SYSTEM AND METHOD

BACKGROUND OF THE INVENTION

1. Field of the Invention

The present invention relates generally to systems and methods for measuring, and more particularly to an automated measuring system and method which can encode required measurement procedures for an object to be measured and assign a suitable measurement apparatus to each dimension of the object.

2. Background of the Invention

Product quality is a crucial factor in a manufacturing enterprise's success. In order to seize potential markets and improve competitiveness, most manufacturing enterprises continuously strive to improve product quality and corresponding services.

It is standard practice for an enterprise to take samples from its own manufactured products and measure dimensions of the samples in order to determine whether the products are acceptable. Traditional measuring methods use length measurement tools such as calipers to measure all dimensions of the samples one by one. Then corresponding statistical calculations are performed manually. These measuring methods are prone to error, because of the low accuracy of manually operated measurement tools and because of human error in the statistical calculations. The accuracy of the final data obtained may be very low. Further, these measuring methods are generally time-consuming, and the corresponding labor costs can be high.

With the ongoing development of computer science, computers are now in widespread use in the art of measuring products. The conventional means adopted is to link automated measurement apparatuses to a computer. The computer obtains measured data from the measurement apparatuses, and runs corresponding application software programs (statistical procedures) in order to perform statistical calculations based on the measured data. Thus human error in the statistical calculations is greatly reduced. However, the location where the actual measurements are performed must generally be the manufacturing site of the products.

In recent years, multiple users of a typical enterprise's computer system have been able to store electronic data on a closed client/server architecture, such as a local area network or a wide area network. Further, with the recent rapid expansion of the Internet, the opportunity for collaborative efforts has greatly increased, and professional measuring departments are now found in many enterprises. Measurement workers and customers of an enterprise may be scattered around the world, yet they can rapidly transmit measurement information and measured data through a variety of networks. The measurement information provided by a customer usually comprises design drawings of an object to be measured and drawing specifications. The professional measuring department then receives the object, and proceeds to measure all the dimensions of the object according to the measurement information. All these apparatuses and procedures overcome the traditional restriction that the location where the actual measurements are performed must be the manufacturing site. However, the above-described means can-not provide encoding of required measurement procedures for the object, and can-not provide automatic assigning of suitable measurement apparatuses for measurement of each dimension of the object.

What is needed is a system and method that can overcome the foregoing shortcomings.

SUMMARY OF THE INVENTION

It is an objective of the present invention to provide an automated measuring system and method which can encode all required measurement procedures for an object to be measured.

It is another objective of the present invention to provide an automated measuring system and method which can assign a suitable measurement apparatus to each dimension of an object to be measured.

To accomplish the above objectives, a measuring system in accordance with a preferred embodiment of the present invention comprises an application server, a database server, a plurality of client computers, and a plurality measurement apparatuses linking to the application server through a network. The application server comprises: a measurement information receiving module for receiving measurement information; a procedure encoding module for encoding all required measurement procedures for objects to be measured; a measurement apparatus assigning module for assigning a suitable measurement apparatus to each of dimensions of the objects; a measuring module for running the encoded measurement procedures to measure all the dimensions of the objects through the assigned measurement apparatuses; a tolerance calculating module for obtaining measured data and a design value of each dimension, and for calculating an actual upper tolerance and an actual lower tolerance for each dimension; and a report generating module for generating measurement reports.

Further, a measuring method according to the present invention is provided. The method comprises the following steps: receiving measurement information; encoding all required measurement procedures for an object to be measured; assigning a suitable measurement apparatus to each of dimensions of the object; running the encoded measurement procedures to measure all the dimensions of the object through the assigned measurement apparatuses; calculating an actual upper tolerance and an actual lower tolerance for each dimension according to measured data and a design value of each dimension; determining whether there is any fault dimension; and generating a measurement report.

Other objects, novel features and advantages of the present invention will be drawn from the following detailed description of the present invention with the attached drawings, in which:

DETAILED DESCRIPTION OF THE INVENTION

Figure 1:
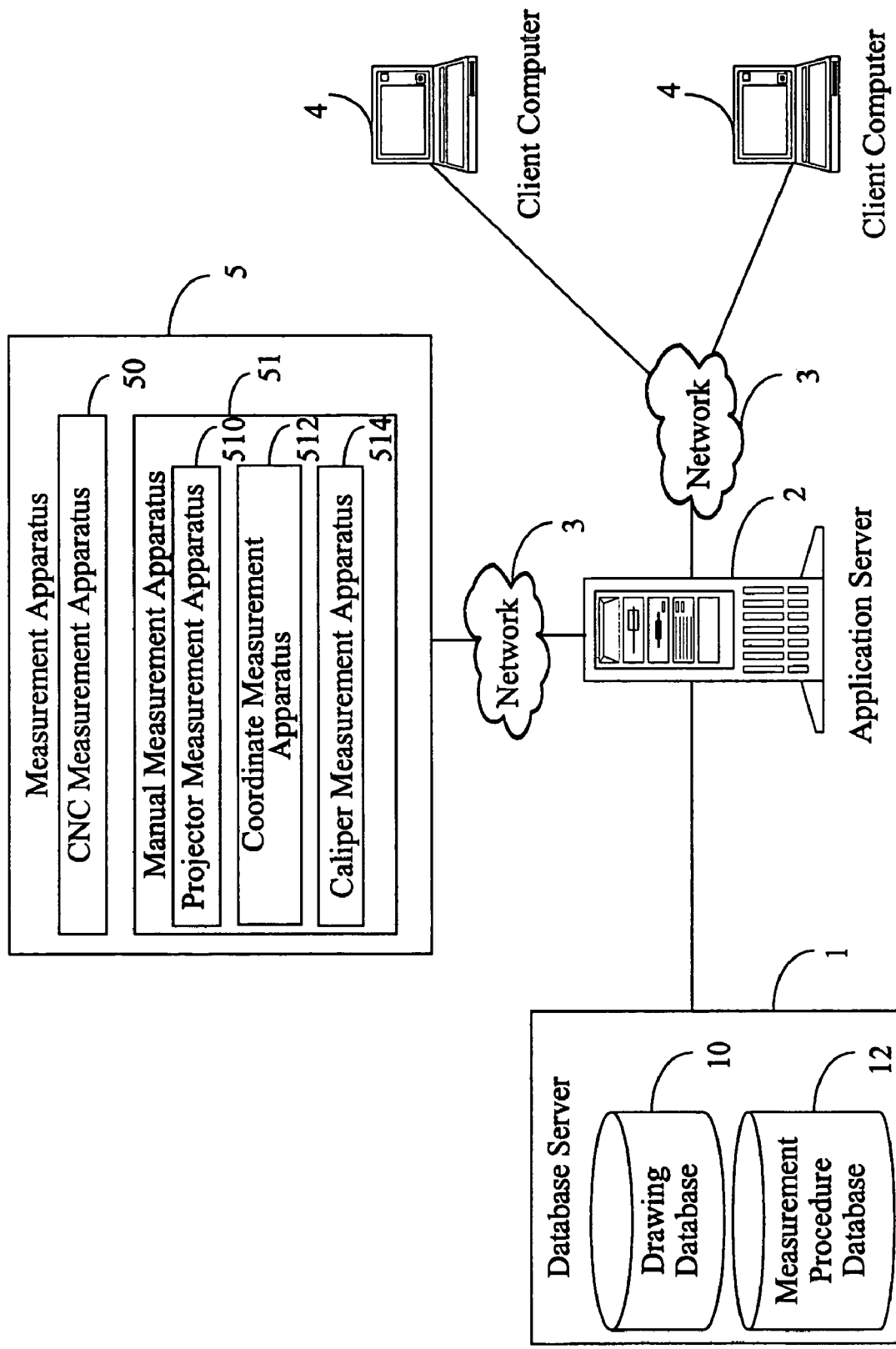
FIG. 1 is a schematic diagram of hardware configuration of an automated measuring system in accordance with the preferred embodiment of the present invention.

FIG. 1 is a schematic diagram of hardware configuration of a measuring system in accordance with the preferred embodiment of the present invention. The measuring system comprises a database server 1, an application server 2, a plurality of client computers 4 (only two shown), a plurality of measurement apparatuses 5 (only one shown), and a network 3 interconnecting the application server 2, client computers 4 and measurement apparatuses 5. The network 3 may be an intranet, the Internet, or any other suitable communications network. The database server 1 is connected with the application server 2 via a database connectivity (not labeled), and comprises a drawing database 10 and a measurement procedure database 12.

The drawing database 10 is used for storing design drawings of objects to be measured. The design drawings of an object are generally a set of Auto-CAD drawings, and may comprise a top view drawing, a bottom view drawing, a left view drawing, a right view drawing, a front view drawing and a back view drawing of the object. The measurement procedure database 12 is used for storing automated measurement procedures and manual measurement procedures.

The database server 1 is also for storing measurement information and measurement reports. The measurement information is usually provided by a customer, and comprises objects to be measured, design drawings of the objects and drawing specifications. The drawing specifications of each object can be comprised in a Microsoft Excel file, and include fields for "dimension number," "design value," "lower tolerance" and "upper tolerance." The dimension number is a serial number that refers to a corresponding dimension in the design drawings. The design value is a value representing a size of the dimension, and may be provided by the customer or obtained from the design drawings of the object. The lower tolerance and the upper tolerance are each a unilateral tolerance, respectively recording an acceptable range of the dimension.

Each measurement report is typically a Microsoft Excel file, and includes fields for "drawing specifications," "sample results," "actual upper tolerance," "actual lower tolerance" and "status." The field of "sample results" records measured data of each dimension. The actual upper tolerance and the actual lower tolerance are calculated according to a design value and measured data of each dimension. The field of "status" includes two sub-fields: "high" and "low," respectively recording a status of a fault dimension. A fault dimension is a dimension generated when any actual tolerance of the dimension is outside an acceptable range of the dimension required in the drawing specifications. An actual tolerance may be an actual upper tolerance or an actual lower tolerance. The sub-field of "high" records whether the actual upper tolerance of a selected dimension is higher than the upper tolerance of the dimension. The sub-field of "low" records whether the actual lower tolerance of a selected dimension is lower than the lower tolerance of the dimension.

The application server 2 is programmed to receive measurement information, to measure all the dimensions of an object to be measured, and to generate a measurement report according to measured data of each dimension. Each client computer 4 provides an interactive interface for users to view design drawings and measurement reports. Each measurement apparatus 5 is provided to carry out measurement operations, and comprises a CNC (Computer Numerical Control) measurement apparatus 50 and a manual measurement apparatus 51. Each manual measurement apparatus 51 further comprises at least one projector measurement apparatus 510, one coordinate measurement apparatus 512, and one caliper measurement apparatus 514.

Figure 2:
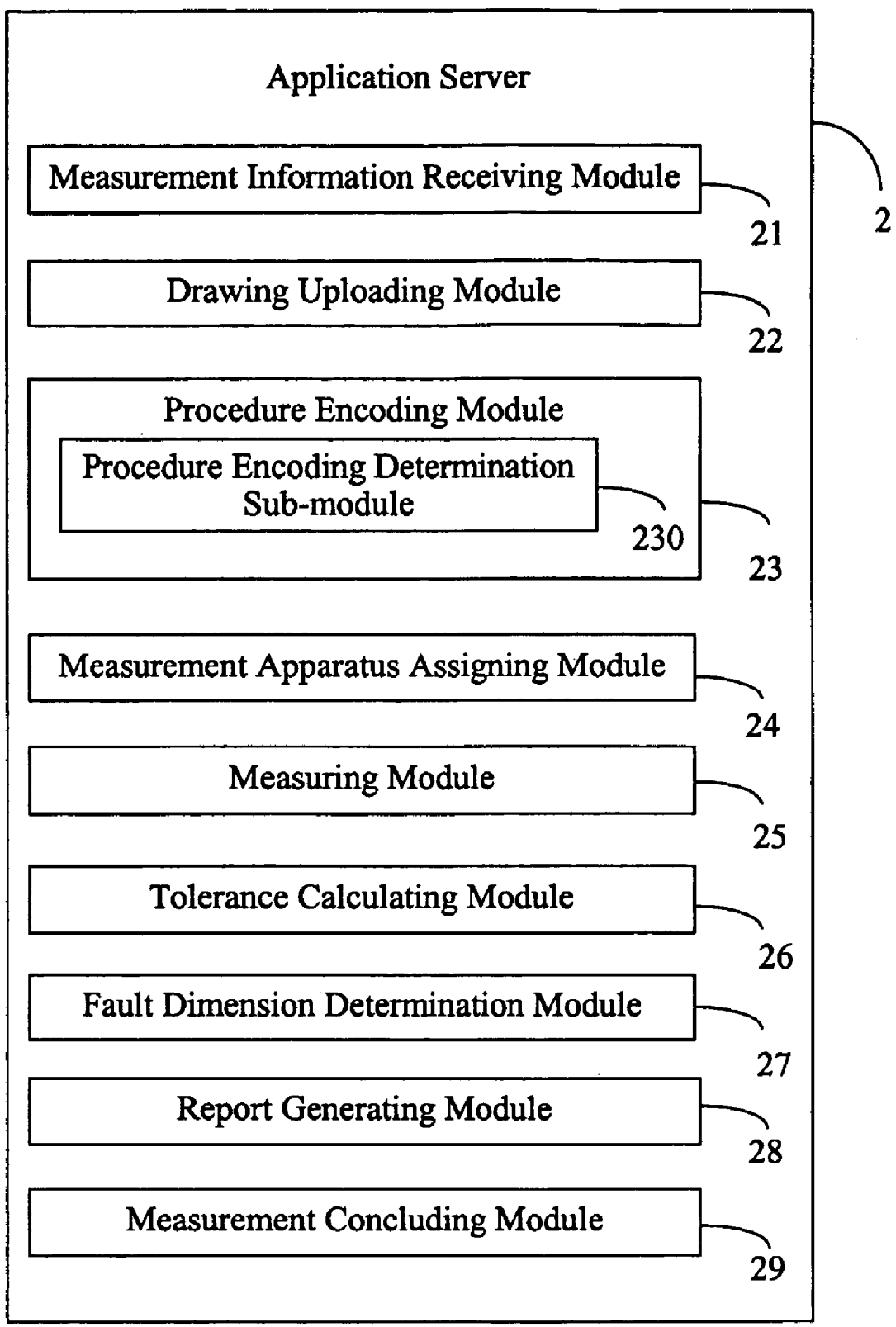
FIG. 2 is a schematic diagram of main software function modules of an application server of the measuring system of FIG. 1.

FIG. 2 is a schematic diagram of software function modules of the application server 2. The application server 2 comprises a measuring information receiving module 21, a drawing uploading module 22, a procedure encoding module 23, a measurement apparatus assigning module 24, a measuring module 25, a tolerance calculating module 26, a fault dimension determination module 27, a report generating module 28, and a measurement concluding module 29.

The measurement information receiving module 21 is provided to receive measurement information. The drawing uploading module 22 is provided to upload design drawings of objects to be measured to the drawing database 10. The procedure encoding module 23 comprises a procedure encoding determination sub-module 230, and is provided to encode all required measurement procedures for the object, and upload the encoded measurement procedures to the measurement procedure database 12. In the preferred embodiment of the present invention, measuring an object requires one or more measurement procedures. The measurement procedures include all required automated measurement procedures and/or manual measurement procedures. The procedure encoding determination sub-module 230 is provided to determine whether there are suitable measurement procedures for the object in the measurement procedure database 12, and to determine whether it is necessary to encode the automated measurement procedures and/or manual measurement procedures.

The measurement apparatus assigning module 24 is provided to assign a suitable measurement apparatus 5 to each dimension of the object. The measuring module 25 is programmed to run the required measurement procedures to measure all the dimensions of the object through the assigned measurement apparatuses 5, to determine whether all the dimensions have been measured, and to re-measure any fault dimensions obtained. The tolerance calculating module 26 is programmed to obtain measured data of each dimension from the measurement apparatus 5 and a design value of each dimension from the design drawings of the object or from the drawing specifications, and to calculate an actual upper tolerance and an actual lower tolerance for each dimension according to the obtained measured data and the obtained design value. The fault dimension determination module 27 is programmed to determine whether there is any fault dimension, by comparing the actual tolerances to respective acceptable ranges of the dimensions in the drawing specifications.

The report generating module 28 is provided to generate a measurement report according to the drawing specifications, the measured data and the actual tolerances of each dimension. The measurement concluding module 29 is provided for one or more managers to audit the measurement report and to make a conclusion about the measurement report, and for transmitting the audited measurement report to the customer.

Figure 3:
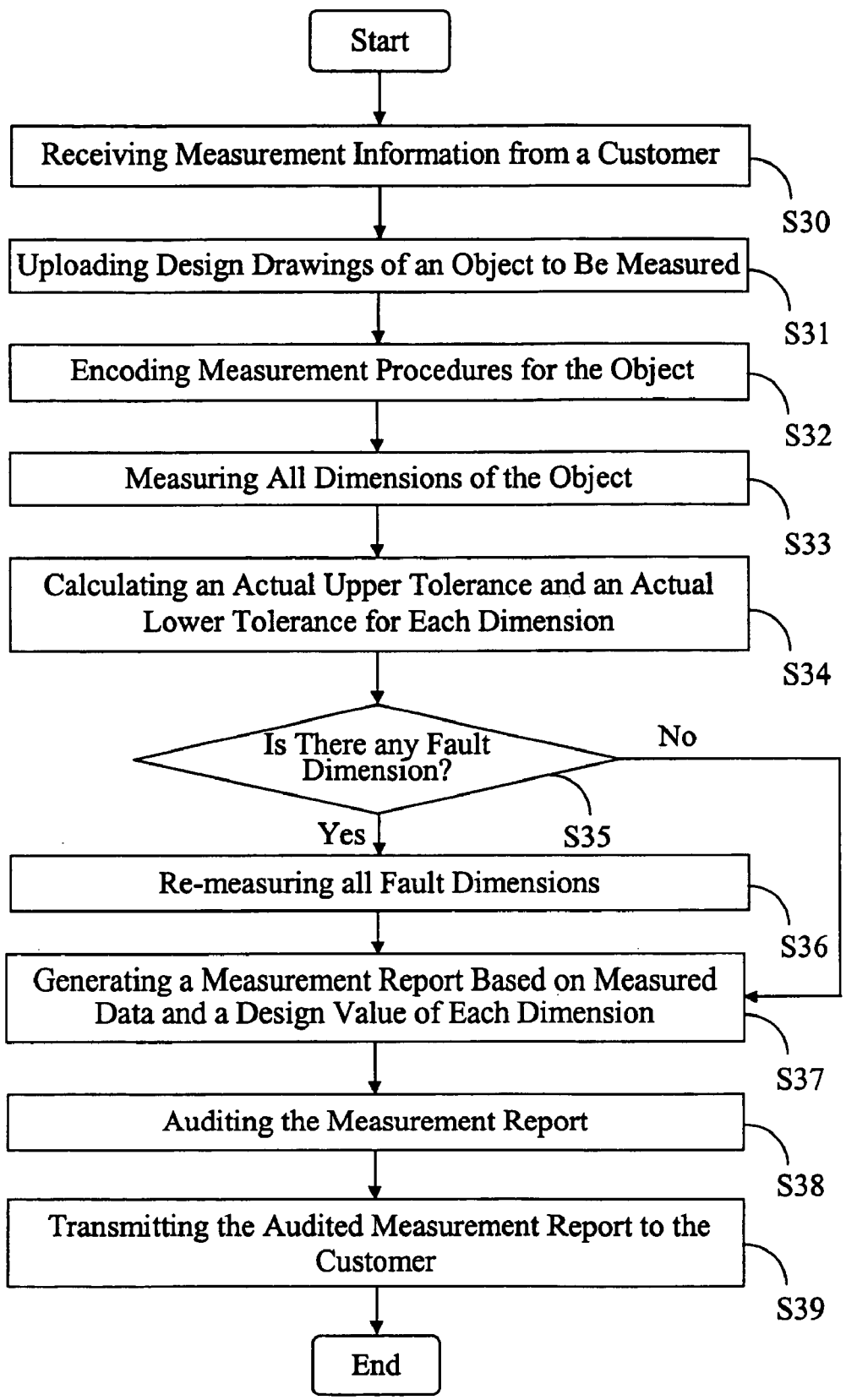
FIG. 3 is a flowchart of a preferred measuring method according to the present invention, utilizing the measuring system of FIG. 1.

FIG. 3 is a flowchart of a preferred measuring method utilizing the above-described measuring system in accordance with the present invention. In step S30, the measurement information receiving module 21 receives measurement information from a customer. In step S31, the drawing uploading module 22 uploads design drawings of an object to be measured to the drawing database 10. In step S32, the procedure encoding module 23 encodes all required measurement procedures for the object. In step S33, the measuring module 25 runs the encoded measurement procedures to measure all the dimensions of the object. In step S34, the tolerance calculating module 26 obtains measured data and a design value of each dimension, and calculates an actual upper tolerance and an actual lower tolerance for each dimension according to the obtained measured data and the obtained design value. In step S35, the fault dimension determination module 27 determines whether there is any fault dimension by comparing the actual tolerances to the respective acceptable ranges of the dimensions in the drawing specifications. If there is no fault dimension, the procedure goes directly to step S37 described below. Otherwise, in step S36, the measuring module 25 re-measures all fault dimensions.

In step S37, the report generating module 28 generates a measurement report according to the drawing specifications and the measured data, the design value and the calculated actual tolerances of each dimension. In step S38, a manager audits the measurement report, and makes a conclusion about the audited measurement report via the measurement concluding module 29. Afterward, in step S39, the measurement concluding module 29 transmits the audited measurement report to the customer.

Figure 4:
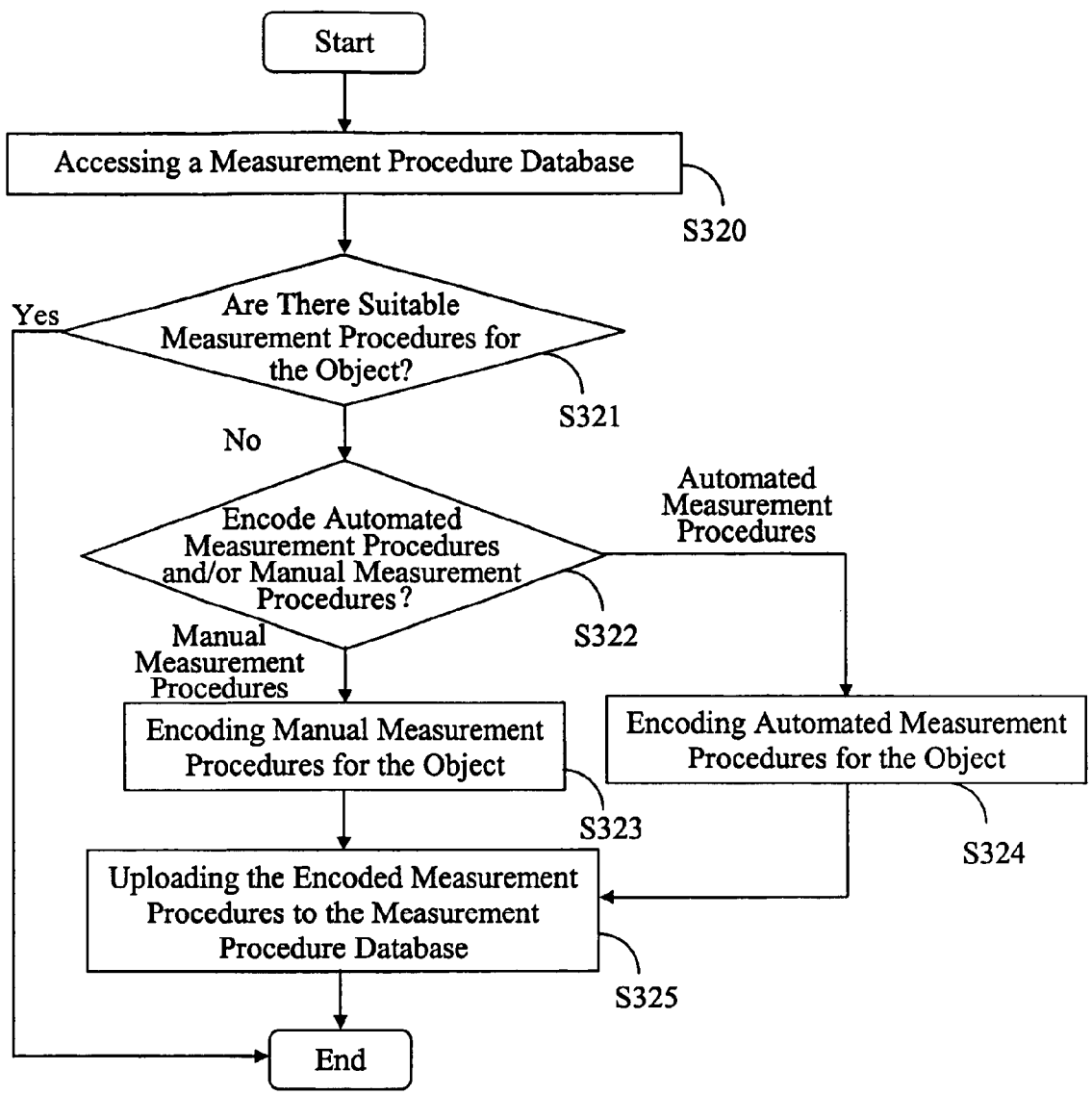
FIG. 4 is a flowchart of implementing one step of FIG. 3, namely encoding measurement procedures for an object.

FIG. 4 is a flowchart of implementing step of S32 of FIG. 3, namely encoding measurement procedures for the object. In step S320, the procedure encoding module 23 accesses the measurement procedure database 12. In step S321, the procedure encoding determination sub-module 230 determines whether there are suitable measurement procedures for the object in the measurement procedure database 12. If there are suitable measurement procedures for the object, the procedure is ended. Otherwise, in step S322, the procedure encoding determination sub-module 230 determines whether it is necessary to encode automated measurement procedures and/or manual measurement procedures. If it is necessary to encode manual measurement procedures, in step S323, the procedure encoding module 23 encodes the required manual measurement procedures for the object. If it is necessary to encode automated measurement procedures, in step S324, the procedure encoding module 23 encodes the required automated measurement procedures for the object. Then in step S325, the procedure encoding module 23 uploads the encoded measurement procedures to the measurement procedure database 12, whereupon the procedure is ended.

Figure 5:
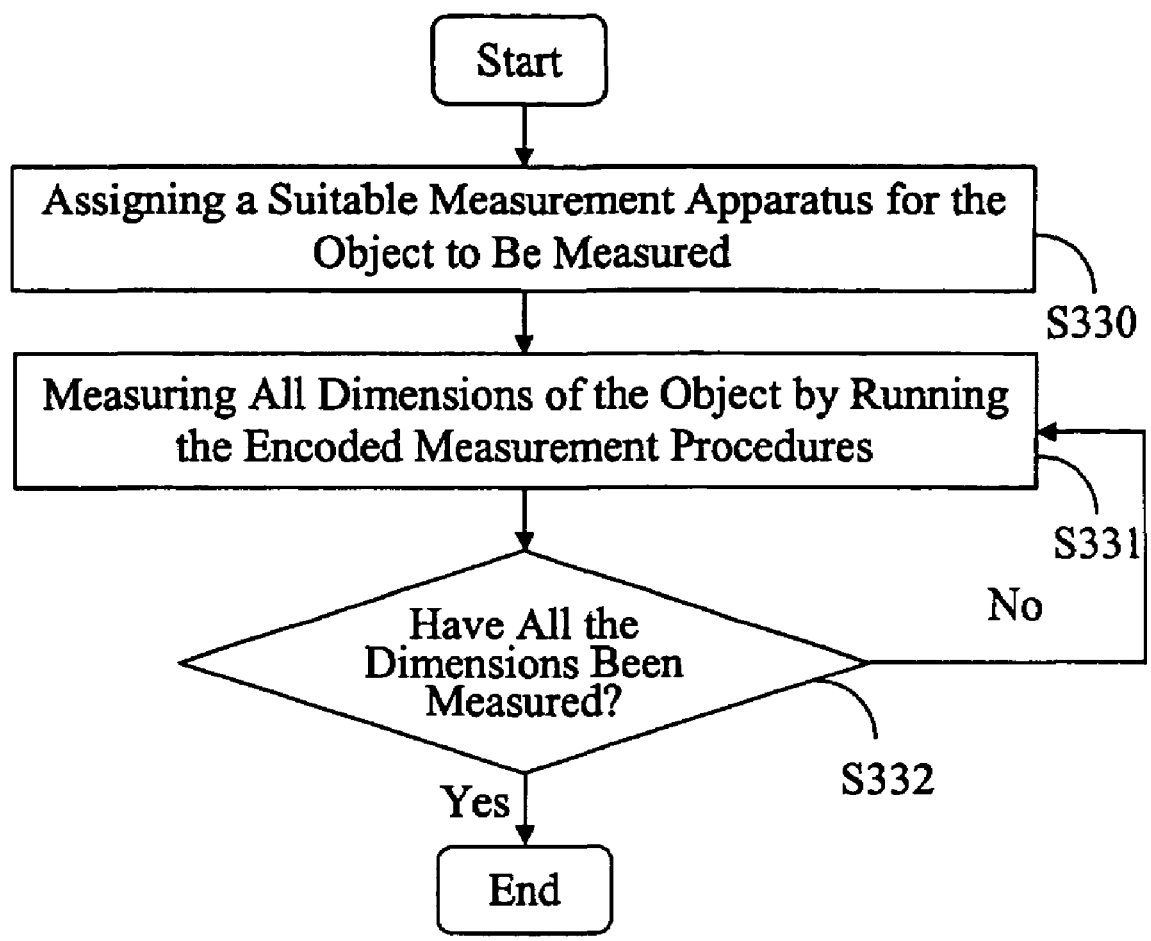
FIG. 5 is a flowchart of implementing another step of FIG. 3, namely measuring all dimensions of the object.

FIG. 5 is a flowchart of implementing step S33 of FIG. 3, namely measuring all dimensions of the object. In step S330, the measurement apparatus assigning module 24 assign a suitable measurement apparatus 5 to each dimension of the object. In step S331, the measuring module 25 runs the required measurement procedures to measure all the dimensions of the object through the assigned measurement apparatuses 5. In step S332, the measuring module 25 determines whether all the dimensions have been measured. If all the dimensions have been measured, the procedure is ended. Otherwise, the procedure returns to step S331 described above.

Figure 6:
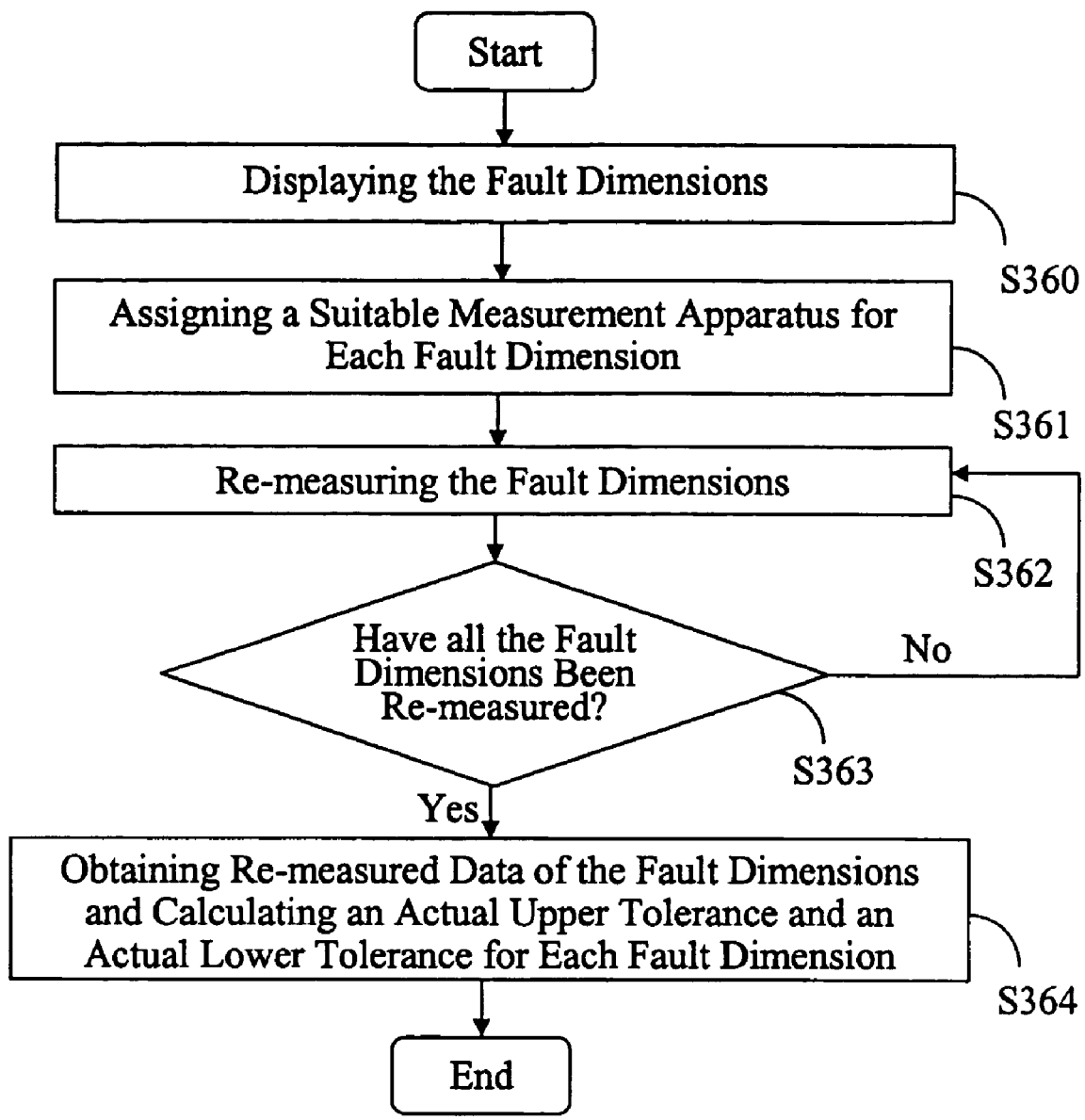
FIG. 6 is a flowchart of implementing still another step of FIG. 3, namely re-measuring any one or more fault dimensions.

FIG. 6 is a flowchart of implementing step S36 of FIG. 3, namely re-measuring all fault dimensions. For convenience, it will be assumed that two or more fault dimensions exist. In step S360, the fault dimension determination module 27 displays the fault dimensions. In step S361, the measure apparatus assigning module 24 assigns a suitable measurement apparatus 5 for each fault dimension. In step S362, the measuring module 25 runs corresponding measurement procedures to re-measure the fault dimensions through the assigned measurement apparatuses 5. In step S363, the measuring module 25 determines whether all the fault dimensions have been re-measured. If all the fault dimensions have been re-measured, in step S364, the tolerance calculating module 26 obtains re-measured data of the fault dimensions, and calculates an actual upper tolerance and an actual lower tolerance for each fault dimension according to the re-measured data and the design value of the fault dimension. If all the fault dimensions have not been re-measured, the procedure returns to step S362 described above.

Although the present invention has been specifically described on the basis of a preferred embodiment and preferred method, the invention is not to be construed as being limited thereto. Various changes or modifications may be made to said embodiment and method without departing from the scope and spirit of the invention.

What is claimed is:

1. An automated measuring system, the measuring system comprising an application server, the application server comprising:

a measurement information receiving module for receiving measurement information;

a procedure encoding module for determining whether there are suitable measurement procedures for objects to be measured, for determining whether it is necessary to encode automated measurement procedures and/or manual measurement procedures for the objects, and for encoding all required measurement procedures for the objects;

a measurement apparatus assigning module for assigning a suitable measurement apparatus to each of dimensions of the objects;

a measuring module for running the encoded measurement procedures to measure all the dimensions of the objects through the assigned measurement apparatuses;

a tolerance calculating module for obtaining measured data and a design value of each dimension, and for calculating an actual upper tolerance and an actual lower tolerance for each dimension; and a report generating module for generating measurement reports.

2. The measuring system according to claim 1, wherein the application server further comprises a drawing uploading module for uploading design drawings of the objects.

3. The measuring system according to claim 1, wherein the procedure encoding module is also for uploading the encoded measurement procedures.

4. The measuring system according to claim 1, wherein the application server further comprises a fault dimension determination module for determining whether there is any fault dimension.

5. The measuring system according to claim 4, wherein the measuring module is also for re-measuring any fault dimension.

6. The measuring system according to claim 1, wherein the application server further comprises a measurement concluding module for one or more managers to audit each measurement report and to make a conclusion about the audited measurement report, and for transmitting the measurement report to a customer.

7. A computer-enabled measuring method comprising the steps of:

receiving measurement information;

encoding all required measurement procedures for an object to be measured;

assigning a suitable measurement apparatus to each of dimensions of the object;

running the required measurement procedures to measure all the dimensions of the object through the assigned measurement apparatuses, and determining whether all the dimensions have been measured;

calculating an actual upper tolerance and an actual lower tolerance for each dimension;

determining whether there is any fault dimension; and generating a measurement report.

8. The measuring method according to claim 7, further comprising the step of uploading design drawings of the object.

9. The measuring method according to claim 7, wherein the step of encoding all required measurement procedures for the object to be measured comprises the steps of:

determining whether there are suitable measurement procedures for the object;

determining whether it is necessary to encode automated measurement procedures and/or manual measurement procedures;

encoding the required automated measurement procedures for the object if it is necessary to encode automated measurement procedures;

encoding the required manual measurement procedures for the object if it is necessary to encode manual measurement procedures; and uploading the encoded measurement procedures.

10. The measuring method according to claim 7, wherein the step of calculating an actual upper tolerance and an actual lower tolerance for each dimension comprises the step of obtaining measured data and a design value of each dimension.

11. The measuring method according to claim 7, further comprising the step of re-measuring any one or more fault dimensions.

12. The measuring method according to claim 11, wherein the step of re-measuring any one or more fault dimensions comprises the steps of:

displaying said fault dimensions;

assigning a suitable measurement apparatus for each fault dimension;

running one or more corresponding measurement procedures to re-measure said fault dimensions through said assigned suitable measurement apparatus;

determining whether all said fault dimensions have been re-measured; and obtaining re-measured data of said fault dimensions, and calculating an actual upper tolerance and an actual lower tolerance for each fault dimension.

13. The measuring method according to claim 7, further comprising the step of auditing the measurement report and making a conclusion about the audited measurement report.

14. The measuring method according to claim 7, further comprising the step of transmitting the audited measurement report to a customer.

15. An automated measuring system, the measuring system comprising an application server, the application server comprising:

a measurement information receiving module for receiving measurement information;

a procedure encoding module for encoding all required measurement procedures for objects to be measured;

a measurement apparatus assigning module for assigning a suitable measurement apparatus to each of dimensions of the objects;

a measuring module for running the encoded measurement procedures to measure all the dimensions of the objects through the assigned measurement apparatuses;

a tolerance calculating module for obtaining measured data and a design value of each dimension, and for calculating an actual upper tolerance and an actual lower tolerance for each dimension;

a report generating module for generating measurement reports; and a measurement concluding module for one or more managers to audit each measurement report and to make a conclusion about the audited measurement report, and for transmitting the measurement report to a customer.

* * * * *